United States Patent
Suzuki et al.

[11] Patent Number: 6,124,699
[45] Date of Patent: Sep. 26, 2000

[54] BATTERY CHARGER DEVICE

[75] Inventors: Naomasa Suzuki, Kanagawa; Shinobu Iida, Tokyo; Kazutoshi Ichinose, Kanagawa, all of Japan

[73] Assignee: Matsushita Electric Industrial, Co., Ltd., Osaka, Japan

[21] Appl. No.: 09/386,497

[22] Filed: Aug. 30, 1999

[30] Foreign Application Priority Data

Sep. 11, 1998 [JP] Japan .................................. 10-276539

[51] Int. Cl.[7] .................................................. H01M 10/46
[52] U.S. Cl. ........................... 320/110; 320/113; 429/100
[58] Field of Search .................................... 320/110, 112, 320/113, 116, FOR 102, FOR 105, FOR 114; 429/96, 99, 100, 149; 307/150; D13/103, 104

[56] References Cited

U.S. PATENT DOCUMENTS

| | | | |
|---|---|---|---|
| 5,347,208 | 9/1994 | Iida | 320/113 |
| 5,656,914 | 8/1997 | Nagele et al. | 320/113 X |
| 5,689,171 | 11/1997 | Ludewig | 320/110 |
| 6,049,192 | 4/2000 | Kfoury et al. | 320/113 |

*Primary Examiner*—Edward H. Tso
*Attorney, Agent, or Firm*—Pearne & Gordon LLP

[57] ABSTRACT

In a battery charger device 1 for a portable telephone, a front pocket 11 suitable for a portable telephone 4 having a large battery pack 3, and a rear pocket 12 suitable for a large battery pack 3 are disposed. Rotatable levers 5 which are urged by spiral springs 6 are disposed in pocket back faces 11a. A small battery pack 2 and a portable telephone 4 having a small battery pack 2 are held by the levers 5. Since the levers 5 are rotated so as to be housed in the battery charger, the large battery pack 3 and the portable telephone 4 having the large battery pack 3 are held by the pocket back faces 11a. The rotatable levers allow a small battery pack and a portable telephone having a small battery pack, and a large battery pack and a portable telephone having a large battery pack to be selectively held in a fixed state. Therefore, either of a small battery pack and a large battery pack can be stably held.

10 Claims, 7 Drawing Sheets

BATTERY CHARGER DEVICE

BACKGROUND OF THE INVENTION

1. Field of the Invention

The present invention relates to a battery charger device, and particularly to a battery charger device which is used for charging a battery used for an electronic device such as a portable telephone.

2. Description of the Prior Art

FIGS. 7A to 7D are views showing the configuration of a battery charger device of the prior art. Referring to FIGS. 7A to 7D, a front pocket 71 is a charging pocket disposed in a battery charger 7 and applicable to a portable telephone 10 having a large battery pack 9. A rear pocket 72 is a charging pocket applicable to the large battery pack 9. Common receiving faces 81 and 91 are formed on a small battery pack 8 and the large battery pack 9, respectively, and have the same shape. Pocket receiving faces 73 are formed in the both pockets so as to abut against the common receiving faces 81 and 91, respectively. Common back faces 82 and 92 are formed on the small and large battery packs 8 and 9, respectively. The packs have the same thickness at the common back faces 82 and 92. Projections 76 are disposed in the pockets so as to abut against the common back faces 82 and 92, respectively. A pin 74 is disposed on the bottom face of the front pocket 71 and to be inserted into a hole 101 of a lower portion of the portable telephone 10. A rib 75 is disposed on a lower portion of the front face of the rear pocket 72, and to abut against a lower portion 83 or 93 of a lower face of the small or large battery pack 8 or 9.

Next, the operation of the battery charger device of the prior art will be described. Referring to FIGS. 7A to 7D, when the portable telephone 10 having the small or large battery pack 8 or 9 is inserted into the front pocket 71, the pin 74 is inserted into the hole 101, and the common back face 82 or 92 abuts against the projection 76. Under this state, the common receiving face 81 or 91 abuts against the pocket receiving face 73. On the other hand, when the small or large battery pack 8 or 9 is inserted into the rear pocket 72, the rib 75 abuts against the lower portion 83 or 93 of the lower face, and the common back face 82 or 92 abuts against the projection 76. Under this state, the common receiving face 81 or 91 abuts against the pocket receiving face 73.

As described above, in the configuration of the battery charger device of the prior art, when the portable telephone 10 having the small or large battery pack 8 or 9 is inserted into the front pocket 71, the pin 74 is inserted into the hole 101, the common back face 82 or 92 abuts against the projection 76, and the pocket receiving face 73 then supports the common receiving face 81 or 91, thereby enabling the portable telephone 10 to be held. When the small or large battery pack 8 or 9 is inserted into the rear pocket 72, the rib 75 abuts against the lower portion 83 or 93 of the lower face, the common back face 82 or 92 abuts against the projection 76, and the pocket receiving face 73 then supports the common receiving face 81 or 91, thereby enabling the small or large battery pack 8 or 9 to be held.

However, the battery charger device of the prior art has a problem in that, when a large battery pack cannot ensure a back face common to a small battery pack, the battery pack cannot be stably held.

SUMMARY OF THE INVENTION

The invention has been conducted in order to solve the problem of the prior art. It is an object of the invention to provide a battery charger device for a portable telephone which can stably hold any one of small and large battery packs.

In order to solve the problem, the invention is configured so that a battery charger device comprises: a pocket for accommodating and fixedly holding a portable telephone having a large battery pack; and a lever which is disposed in a back face of said pocket, which fixedly holds a portable telephone having a small battery pack, in said pocket, and which, when a portable telephone having a large battery pack is to be accommodated, is rotated to be housed in said back face of said pocket.

Further, a battery charger device comprises: a front pocket for accommodating and fixedly holding a portable telephone having a large battery pack; a rear pocket for accommodating and fixedly holding a large battery pack; a front-pocket lever which is disposed in a back face of the front pocket, which fixedly holds a portable telephone having a small battery pack, in the front pocket, and which, when a portable telephone having a large battery pack is to be accommodated, is rotated to be housed in the back face of the front pocket; and a rear-pocket lever which is disposed in a back face of the rear pocket, which fixedly holds a small battery pack in the rear pocket, and which, when a large battery pack is to be accommodated in the rear pocket, is rotated to be housed in the back face of the rear pocket.

According to these configuration, either of small and large battery packs can be selectively held in a fixed state by the back face of the pocket or the lever.

Alternatively, blocks are respectively disposed in lower portions of the back faces of the front and rear pockets, the blocks having a block upper face which guides a small battery pack to a proper holding position and a block front face which abuts against a common back face of a large battery pack or a small battery pack, and spiral springs are respectively disposed inside the front- and rear-pocket levers, the spiral springs having an urging force of a degree which is sufficient for causing respective one of the front- and rear-pocket levers not to rest at an improper position.

According to this configuration, even when a small battery pack or a portable telephone having a small battery pack is inserted into one of the pockets in any direction, the pack or the telephone is guided to the proper holding position, so that the block front face abuts against the common back face, thereby enabling the pack or the telephone to be held in a fixed state by the lever.

Alternatively, a jaw portion is disposed on a front face of the front pocket, and a height of the front face of the front pocket corresponds to a position of the front-pocket lever.

According to this configuration, even when a large battery pack or a portable telephone having a large battery pack is inserted into the pocket in any direction, the wall face of the lower portion of the back face of the large battery pack, serving as a discrimination point with respect to a small battery pack, always catches the tip end of the lever, and the lever is inevitably housed in the battery charger. Therefore, a large battery pack or a portable telephone having a large battery pack can be always held in a fixed state by the pocket back face.

Alternatively, a height of the jaw portion of the front face of the front pocket corresponds to the position of the front-pocket lever, a position of the block, a thickness of the portable telephone, and sizes of the large and small battery packs.

According to this configuration, in the case where a portable telephone having a battery pack and held in a fixed state in the front pocket is to be detached therefrom, not only when the telephone is detached in an upward direction but also when the telephone is detached with being forward tilted, the portable telephone having the battery pack can be smoothly detached while the common back face of the small or large battery pack is prevented from being caught by the front face of the block.

Alternatively, a tapered face is disposed in a front face of the rear pocket.

According to this configuration, in the case where a battery pack held in the rear pocket is to be detached therefrom, when the battery pack is forward tilted, an edge portion of the lower face of the battery pack slides along the tapered face, and the battery pack is spontaneously lifted up. Not only when the telephone is detached in an upward direction but also when the telephone is detached with being forward tilted, therefore, the battery pack can be smoothly detached while the common back face of the battery pack is prevented from being caught by the front face of the block.

Alternatively, rotation shafts of the front- and rear-pocket levers are disposed below a perpendicular from a contact point of corresponding one of the pocket levers and respective one of the battery packs to the back face of corresponding one of the pockets.

According to this configuration, even when a load is applied in a holding state to the lever in the direction toward the back face of the pocket, a component force in the rotation direction of the lever is not generated, so that the lever is prevented from being rotated. Therefore, a small battery pack and a portable telephone having a small battery pack can be held more stably.

BRIEF DESCRIPTION OF THE PREFERRED EMBODIMENTS

DETAILED DESCRIPTION OF THE PREFERRED EMBODIMENTS

Hereinafter, embodiments of the invention will be described in detail with reference to FIGS. 1A to 6B.

First Embodiment

A first embodiment of the invention is a battery charger device in which a rotatable front-pocket lever is disposed in a back face of a front pocket for holding a portable telephone, and a rotatable rear-pocket lever is disposed in a back face of a rear pocket for holding a battery pack.

Figure 1A:
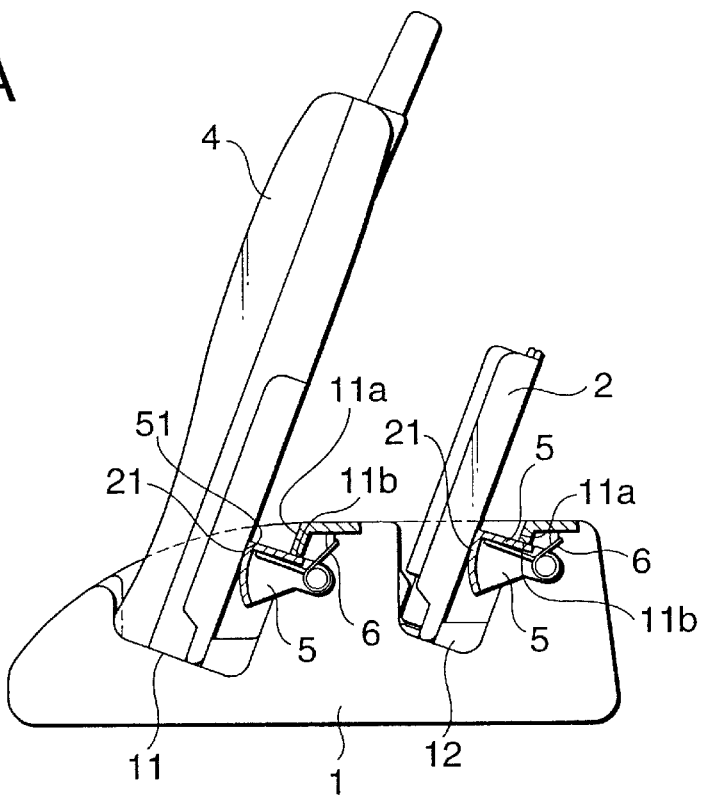
FIGS. 1A and 1B are external views showing the configuration of the battery charger device of a first embodiment of the invention.
Figure 1B:
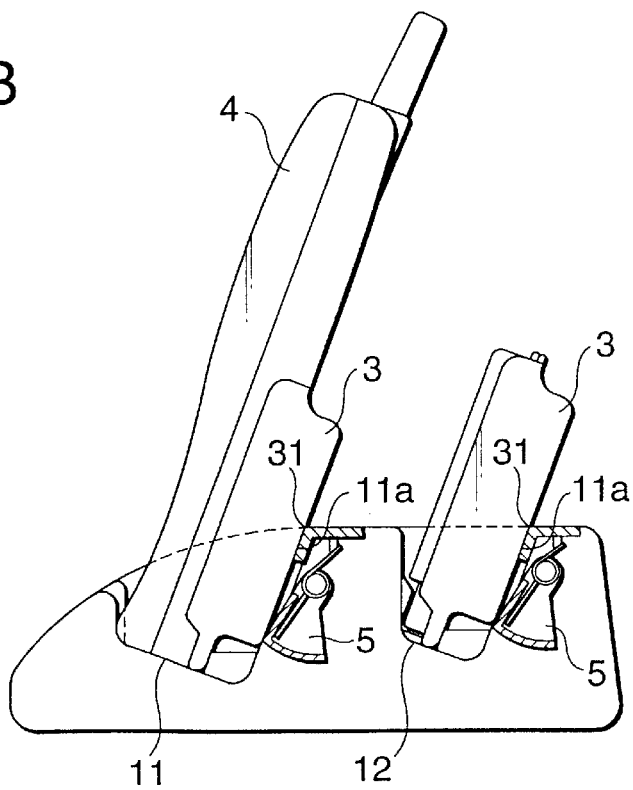

FIGS. 1A and 1B are views showing the configuration of the battery charger device of the first embodiment of the invention. Referring to FIGS. 1A and 1B, the battery charger device 1 is a battery charger comprising: a front pocket 11 applicable to a portable telephone 4 having a large battery pack 3; and a rear pocket 12 applicable to a large battery pack 3. Each of levers 5 is a lever which is urged by a spiral spring 6 that is disposed inside the lever. Each lever is placed in the back face 11a of the corresponding pocket, and fixed to a predetermined position by a stopper 11b. Each of small-battery receiving faces 21 is a face which receives a small battery pack that is held by the corresponding lever 5, and abuts against a lever receiving face 51. Each of large-battery receiving faces 31 is a face which receives a large battery pack that is held by the corresponding pocket back face 11a.

Next, the operation of the thus configured battery charger device of the first embodiment will be described. As shown in FIG. 1A, when the portable telephone 4 having a small battery pack 2, and a small battery pack 2 are inserted into the front and rear pockets 11 and 12, the lever receiving faces 51 support the small-battery receiving faces 21, respectively. Therefore, the small battery pack 2 and the portable telephone 4 having the small battery pack 2 are held by the levers 5.

As shown in FIG. 1B, when the portable telephone 4 having the large battery pack 3, and the large battery pack 3 are respectively inserted into the front and rear pockets 11 and 12, the levers 5 are housed into the battery charger, and the pocket back faces 11a support the large-battery receiving faces 31. Therefore, the large battery pack 3 and the portable telephone 4 having the large battery pack 3 are held by the pocket back faces 11a.

As described above, according to the first embodiment of the invention, the battery charger device is configured so that the rotatable front-pocket lever is disposed on the back face of the front pocket, and the rotatable rear-pocket lever is disposed in the back face of the rear pocket. Therefore, a small battery pack and a portable telephone having a small battery pack are held by the levers, and a large battery pack and a portable telephone having a large battery pack are held by the back faces of the pockets. As a result, two kinds of battery packs, or small and large battery packs can be selectively held in a fixed state by the levers or the back faces of the pockets.

Second Embodiment

A second embodiment of the invention is a battery charger device in which a small battery pack is guided to a proper holding position by the upper face of a block that is disposed in a lower portion of the back face of a pocket, the front face of the block having a relatively large area is caused to abut against the common back face to assist the small battery pack in self-standing, and a portable telephone or the like is held in a proper position by a lever having a spiral spring of an urging force of a degree that enables the lever not to stop midway.

Figure 2A:
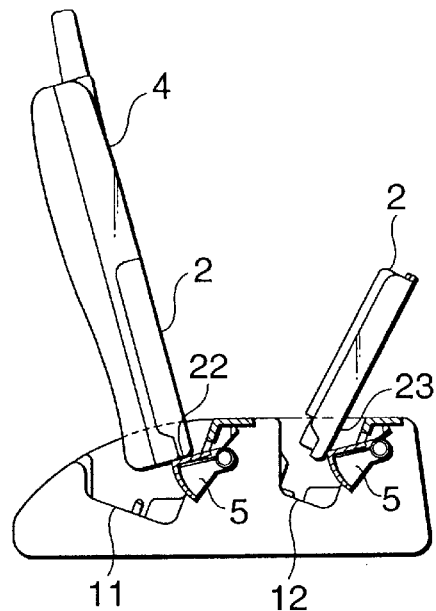
FIGS. 2A to 2C are external views showing the configuration of the battery charger device of a second embodiment of the invention.
Figure 2B:
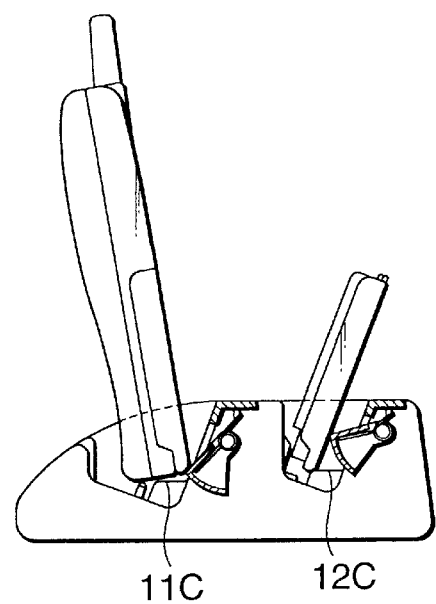
Figure 2C:
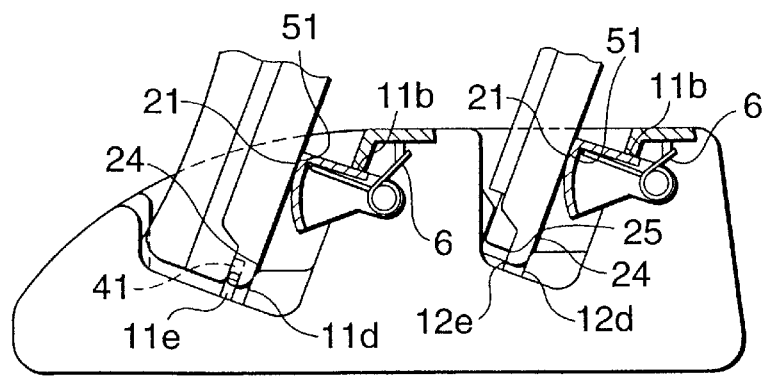

FIGS. 2A to 2C are views showing the configuration of the battery charger device of the second embodiment of the invention. Referring to FIG. 2A, a bottom face 22 and a back face 23 are the bottom face and the back face of the small battery pack 2, respectively. In the case where the portable telephone 4 having the small battery pack 2, and the small battery pack 2 are to be inserted into the front and rear pockets 11 and 12, respectively, when the bottom face 22 and the back face 23 are contacted with the lever 5, the lever 5 may be rotated.

Referring to FIG. 2B, block upper faces 11c and 12c are the upper faces of blocks which are disposed in lower portions of the back faces of the front and rear pockets 11 and 12, respectively. The upper faces are forward tilted.

Referring to FIG. 2C, block front faces 11d and 12d are the front faces of the blocks, and are to abut against the common back faces 24 which serve as common back faces with respect to a large battery pack. A pin 11e is a pin which is disposed on the bottom face of the pocket 11 and to be inserted into a hole 41 of the bottom face of the portable telephone 4. A fitting rib 12e is a rib disposed in a lower portion of the front face of the pocket 12, and to be fitted into a fitting rib receiving face 25 in a lower portion of the lower face of the small battery pack 2.

Next, the operation of the thus configured battery charger device of the second embodiment of the invention will be described. When the portable telephone 4 having the small battery pack 2, and the small battery pack 2 are inserted into the front and rear pockets 11 and 12, the block upper faces 11c and 12c which are forward tilted guide the portable telephone 4 and the small battery pack 2 to the proper positions, respectively. The block front faces 11d and 12d abut against the common back faces 24, the pin 11e is inserted into the hole 41, and the fitting rib 12e is fitted into the fitting rib receiving face 25.

When the portable telephone 4 having the small battery pack 2, and the small battery pack 2 are inserted into the front and rear pockets 11 and 12, respectively, the portable telephone 4 and the small battery pack 2 are guided to the proper positions by the block upper faces 11c and 12c which are forward tilted. The block front faces 11d and 12d abut against the common back faces 24, the pin 11e is inserted into the hole 41, and the fitting rib 12e is fitted into the fitting rib receiving face 25. In this way, the portable telephone 4 having the small battery pack 2, and the small battery pack 2 can be fixed at the lower sides of the front and rear pockets 11 and 12, respectively.

By setting the clearances between the block front faces 11d and 12d and the abutting common back faces 24 to be small, and the block front faces 11d and 12d to have a relatively large area, it is possible to assist the portable telephone 4 having the small battery pack 2, and the small battery pack 2 to self-stand.

Furthermore, the urging force of the spiral springs 6 may be set to be slightly higher. According to this configuration, even if the bottom face 22 or the back face 23 which can be contacted with the lever 5 causes at a middle of the insertion process the lever 5 to rotate, the lever does not stop midway and returns to the proper position where the lever is stopped by the stopper 11b. Since the small-battery receiving faces 21 in the upper side can be stably held by the lever receiving faces 51, the small battery pack 2, and the portable telephone 4 having the small battery pack 2 can be selectively held in a fixed state by the levers 5. Although the urging force of the spiral springs 6 is set to be slightly higher, the urging force has a degree which does not adversely affect the operations of stably holding the portable telephone 4 having the large battery pack 3, and the large battery pack 3.

As described above, in the second embodiment of the invention, the battery charger device is configured so that the blocks are respectively disposed in lower portions of the back faces of pockets, the blocks having the block upper face which guides a small battery pack to the proper holding position and the block front face which has a relatively large area and which abuts against the common back face, and spiral springs are respectively disposed inside the levers, the spiral springs having an urging force of a degree which is sufficient for causing a portable telephone or the like to be held in the proper position. Therefore, the lever does not stop midway, and a portable telephone having a small battery pack, and a small battery pack can be fixed by lower portions of the pockets and the lever.

Third Embodiment

A third embodiment of the invention is a battery charger device in which a jaw portion is disposed on a front face of a front pocket, and the height of the pocket front face corresponds to the position of the lever.

Figure 3A:
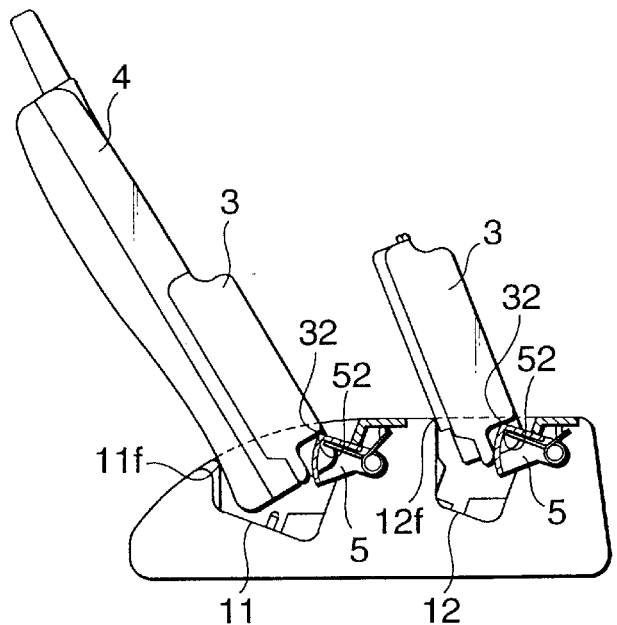
FIGS. 3A to 3C are external views showing the configuration of the battery charger device of a third embodiment of the invention.
Figure 3B:
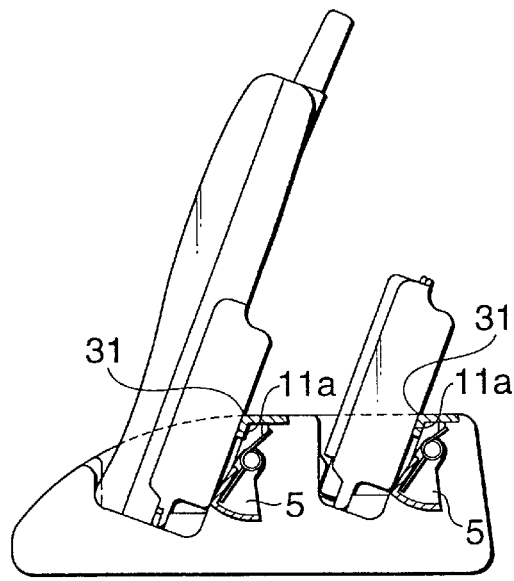
Figure 3C:
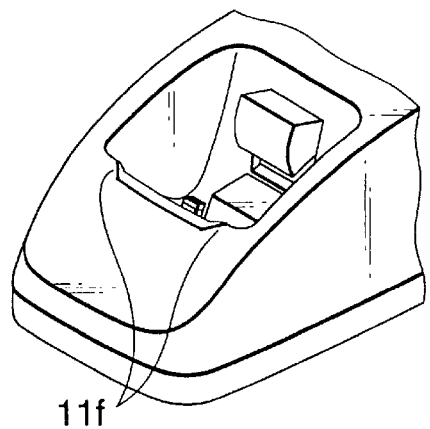

FIGS. 3A to 3C are views showing the configuration of the battery charger device of the third embodiment of the invention. Referring to FIG. 3A, a wall face 32 is a wall faces which is formed on a large battery pack 3 and which serves as a discrimination point with respect to a small battery pack 2. A lever tip end 52 is the highest point of each lever 5 in a natural state, and is to abut against the wall face 32. A jaw 11f is a jaw portion which is disposed on the front face of the front pocket 11 (FIG. 3C), and increases the height of the front face of the front pocket 11. A pocket front mouth 12f is configured by an upper portion of the front face of the rear pocket 12. In the rear pocket 12, the pocket front mouth itself is higher.

Next, the operation of the battery charger device of the third embodiment of the invention will be described. As shown in FIG. 3A, when the portable telephone 4 having the large battery pack 3, and the large battery pack 3 are inserted into the front and rear pockets 11 and 12, the wall faces 32 are contacted with the lever tip ends 52, respectively, because the height of the jaw 11f of the front face of the front pocket 11, and that of the pocket front mouth 12f of the front face of the rear pocket 12 are large. As shown in FIG. 3B, the levers 5 are housed into the battery charger, and the large-battery receiving faces 31 of the large battery packs 3 are stably held by the pocket back faces 11a.

Furthermore, in the same manner as the second embodiment, also the lower sides of the portable telephone 4 and the large battery pack 3 can be fixed. Therefore, the large battery pack 3, and the portable telephone 4 having the large battery pack 3 can be always held in a fixed state by the pocket back faces.

In place of disposing the jaw 11f so as to heighten the front face of the front pocket 11, the whole height of the front face of the front pocket 11 may be adjusted.

As described above, in the third embodiment of the invention, the battery charger device is configured so that the jaw portion is disposed on the front face of the front pocket, and the height of the pocket front face corresponds to the position of the lever. Not only when a large battery pack or a portable telephone having a large battery pack is inserted from the upper side, but also when such a battery pack or a telephone is inserted from an obliquely forward side, therefore, the wall face of the lower portion of the back face of the large battery pack, serving as a discrimination point with respect to a small battery pack, always catches the tip end of the lever, so that the lever is surely housed in the battery charger. Consequently, the upper side of a large battery pack or a portable telephone having a large battery pack can be always stably held by the pocket back face.

Fourth Embodiment

A fourth embodiment of the invention is a battery charger device in which the height of the jaw portion of the front face of the front pocket corresponds to the position of the front-pocket lever, the position of the block, the thickness of the portable telephone, and the sizes of large and small battery packs.

Figure 4A:
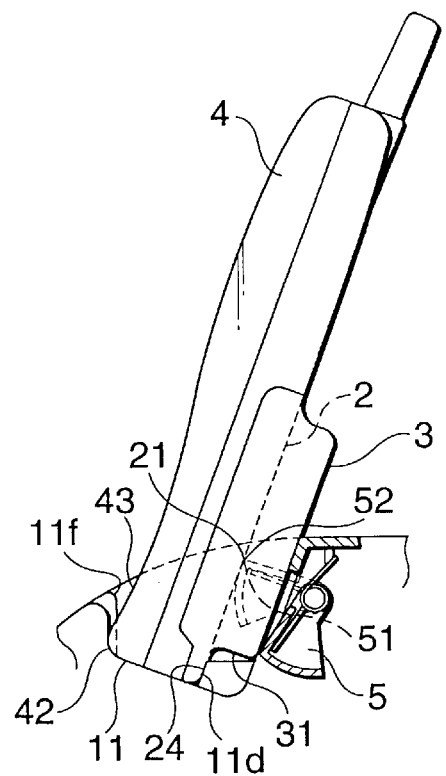
FIGS. 4A and 4B are external views showing the configuration of the battery charger device of a fourth embodiment of the invention.
Figure 4B:
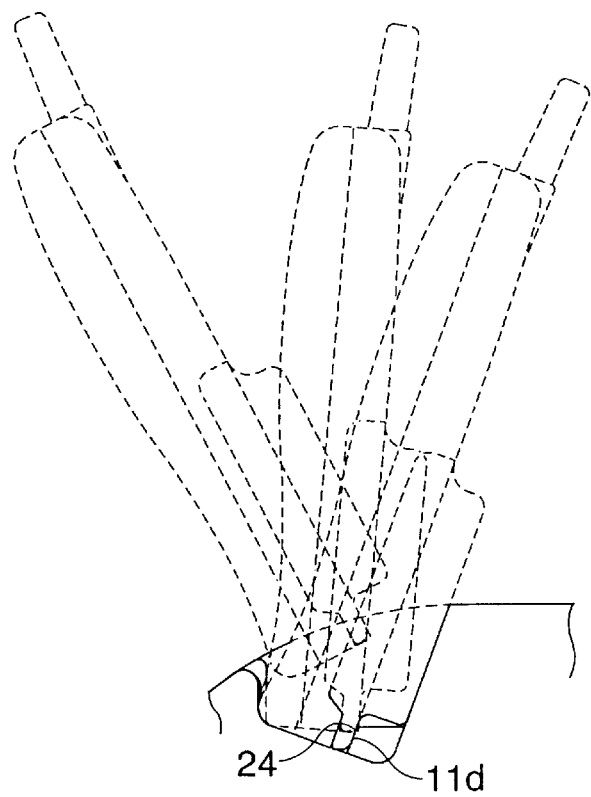

FIGS. 4A and 4B are views showing the configuration of the battery charger device of the fourth embodiment of the invention. Referring to FIG. 4A, an edge portion 42 is a portion which, when the portable telephone 4 held in a fixed state in the front pocket 11 is to be detached with being forward tilted, serves as a fulcrum for the rotating portable telephone 4. The body front face 43 is a portion of the portable telephone 4 which is rotated with using the edge portion 42 as a fulcrum, and the portion abuts against the jaw 11f.

Next, the operation of the thus configured battery charger device of the fourth embodiment of the invention will be described. When the portable telephone 4 held in a fixed state is to be detached with being forward tilted, the portable telephone 4 is rotated with using the edge portion 42 as a fulcrum, and the jaw 11f abuts against the body front face 43. As the height of the jaw 11f is lower, therefore, the detaching operation can be conducted more easily. However, the configuration in which the height of the jaw 11f is made lower conflicts with the third embodiment. In order to cause the wall face 32 to always catch the lever tip ends 52, the level of the lever receiving faces 51, i.e., that of the lever 5 must be lowered. This may impair the stable holding.

Therefore, the height of the jaw 11f is adjusted in accordance with the thickness of the portable telephone 4, the distance between the jaw 11f and the lever tip ends 52, and the clearance between the upper end of the block front face 11d and the common back face 24, so as not to be large in excess of that needed. In the configuration where the jaw 11f is set to have a height of a minimum required level, when the portable telephone 4 is to be detached from the front pocket 11 in the upward or forward direction, the common back face 24 is prevented from being caught by the block front face 11d, so that the portable telephone 4 can be smoothly detached from the pocket (FIG. 4B).

In place of the height of the jaw 11f, the whole height of the front face of the front pocket 11 having no jaw portion may be adjusted.

As described above, in the fourth embodiment of the invention, the height of the front face of the front pocket of the battery charger device is set to a minimum required value corresponding to the position of the front-pocket lever, that of the block, the thickness of the portable telephone, and the sizes of the large and small battery packs. Therefore, a portable telephone having a battery pack can be smoothly detached from a pocket.

Fifth Embodiment

A fifth embodiment of the invention is a battery charger device in which a tapered face is disposed in the front face of the rear pocket.

Figure 5A:
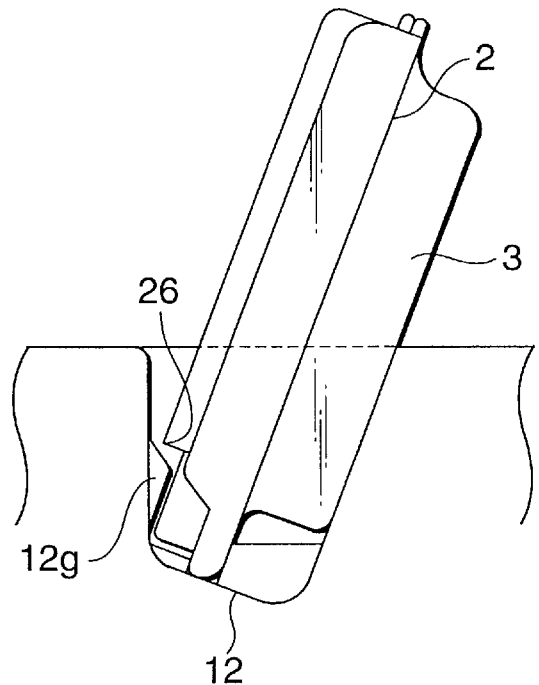
FIGS. 5A and 5B are external views showing the configuration of the battery charger device of a fifth embodiment of the invention.
Figure 5B:
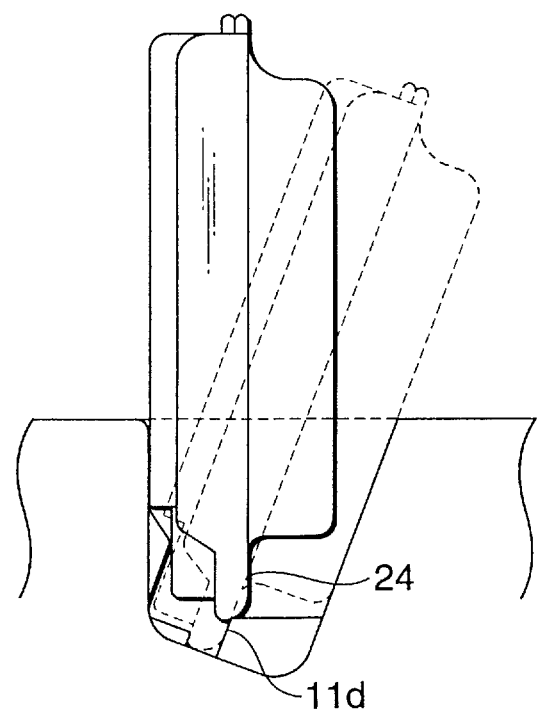

FIGS. 5A and 5B are views showing the configuration of the battery charger device of the fifth embodiment of the invention. Referring to FIG. 5A, a tapered face 12g is a slope which is formed in the front face of the rear pocket 12. When the small battery pack 2 held in a fixed state in the rear pocket 12 is to be detached therefrom with being forward tilted, the tapered face abuts against an edge portion 26 of the lower face of the small battery pack 2.

Next, the operation of the thus configured battery charger device of the fifth embodiment of the invention will be described. When the small battery pack 2 held in a fixed state in the rear pocket 12 is to be detached therefrom with being forward tilted, the edge portion 26 of the lower face upward slides along the tapered face 12g, and hence the small battery pack 2 is lifted up. Since the small battery pack 2 is upward detached, as shown in FIG. 5B, the small battery pack 2 can be smoothly detached while the common back face 24 is prevented from being caught by the block front face 11d, not only when the small battery pack is detached in an upward direction but also when it is detached in a forward direction. This is applicable also in the case of the large battery pack 3.

As described above, in the fifth embodiment of the invention, since the tapered face is disposed in the front face of the rear pocket of the battery charger device, it is possible to smoothly detach a battery pack.

Sixth Embodiment

A sixth embodiment of the invention is a battery charger device in which a rotation shaft of a lever is disposed below a perpendicular from a lever holding face to a pocket back face.

Figure 6A:
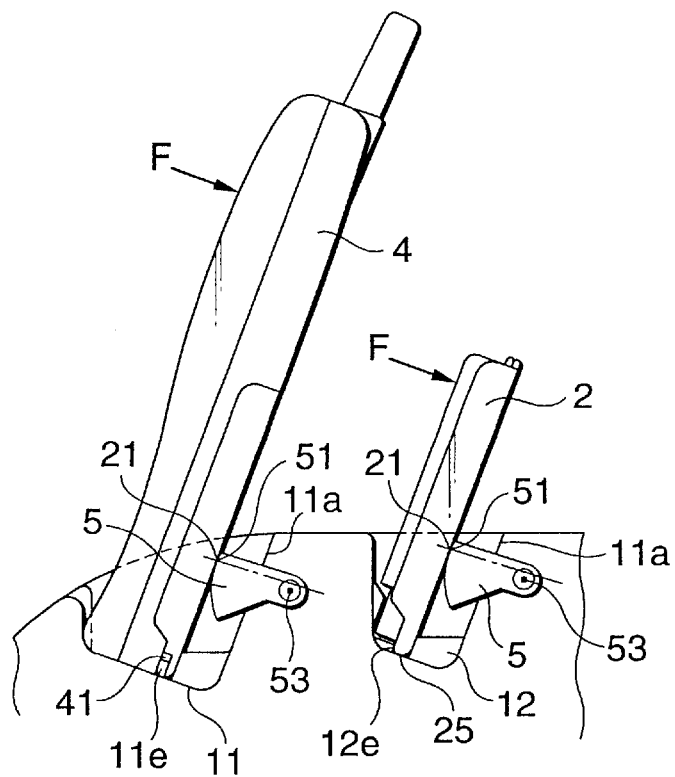
FIGS. 6A and 6B are external views showing the configuration of the battery charger device of a sixth embodiment of the invention.
Figure 6B:
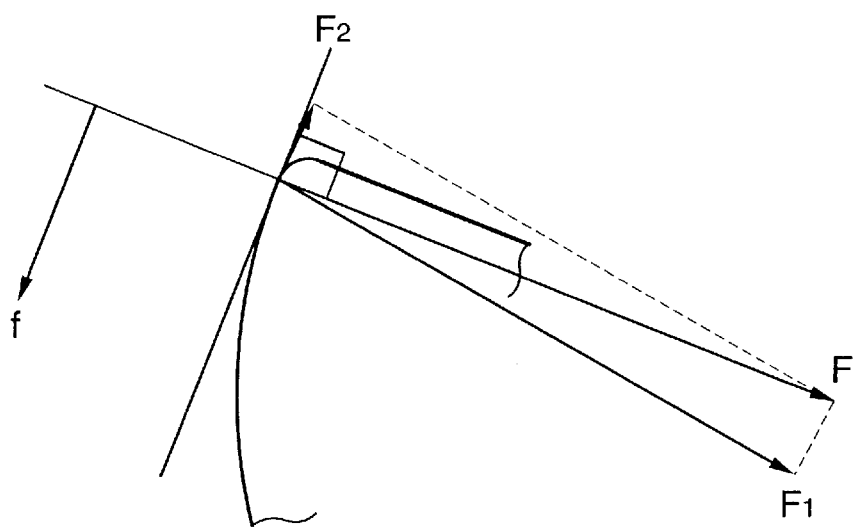
Figure 7A:
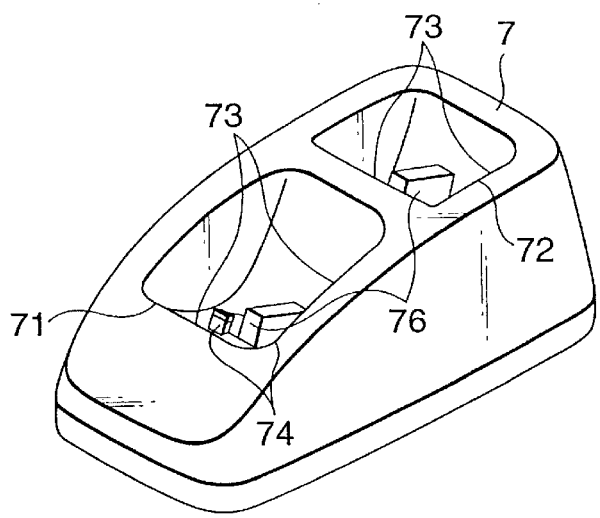
FIGS. 7A to 7D are external views of a battery charger device of the prior art.
Figure 7B:
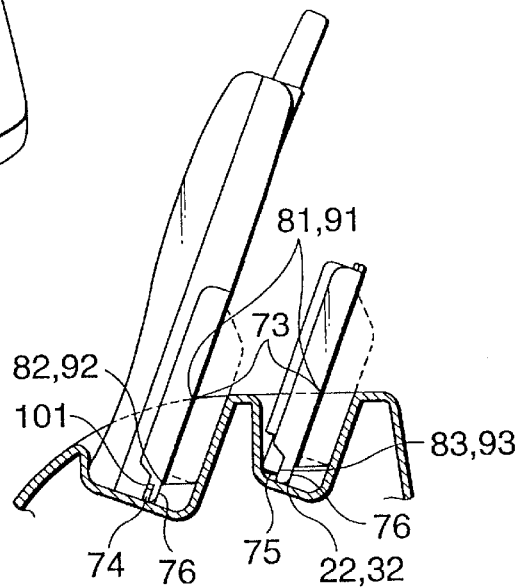
Figure 7C:
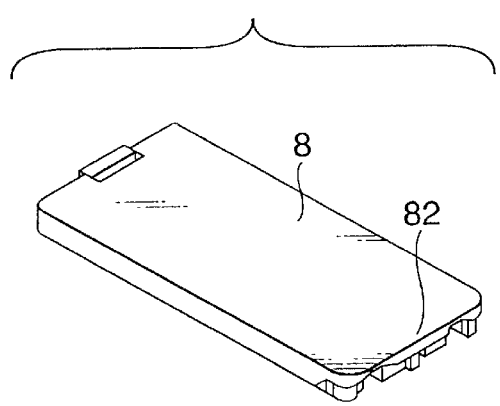
Figure 7C:
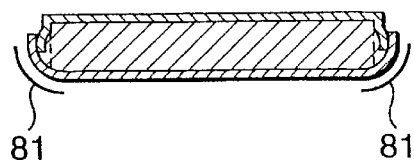
Figure 7D:
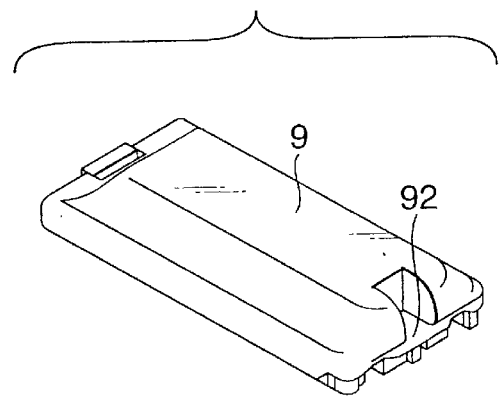
Figure 7D:
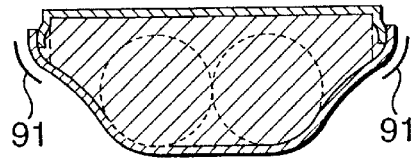

FIGS. 6A and 6B are views showing the configuration of the battery charger device of the sixth embodiment of the invention. Referring to FIG. 6A, rotation shafts 53 are shafts of the levers 5 which are rotatable, and are positioned below a perpendicular from a lever holding face 51 to the corresponding back face 11a.

Next, the operation of the thus configured battery charger device of the sixth embodiment of the invention will be described. Under the state where the portable telephone 4 having the small battery pack 2, and the small battery pack 2 are held in a fixed state by the front and rear pockets 11 and 12, respectively, when a load F is applied in the direction of the arrows in FIG. 6A, the combinations of the pin 11e and the hole 41 which are engaged with each other in a lower portion of the pocket, and the fitting rib 12e and the fitting rib receiving face 25 function to respectively fix the portable telephone 4 and the small battery pack 2, and hence the load F is received by the lever holding faces 51. As shown in FIG. 6B, component forces F1 and F2 of the load F are generated. In the generated component forces, no force f which acts on the lever in a rotatable direction is generated, so that the lever 5 is not rotated. Therefore, the portable telephone 4 having the small battery pack 2, and the small battery pack 2 can be held in a more stable state.

As described above, in the sixth embodiment of the invention, the rotation shafts of the levers of the battery charger device are disposed below the perpendicular from the lever holding face to the corresponding pocket back face. Even when a load is applied in the direction toward the pocket back face, therefore, the lever is not rotated, and a portable telephone and a small battery pack can be stably held.

As apparent from the above description, according to the invention, the battery charger device is configured so to comprises: a front pocket for accommodating and fixedly holding a portable telephone having a large battery pack; a rear pocket for accommodating and fixedly holding a large battery pack; a front-pocket lever which is disposed in a back face of the front pocket, which fixedly holds a portable telephone having a small battery pack, in the front pocket, and which, when a portable telephone having a large battery pack is to be accommodated, is rotated to be housed in the back face of the front pocket; and a rear-pocket lever which is disposed in a back face of the rear pocket, which fixedly holds a small battery pack in the rear pocket, and which, when a large battery pack is to be accommodated in the rear pocket, is rotated to be housed in the back face of the rear pocket. Therefore, it is possible to attain effects that a small battery pack and a portable telephone having a small battery pack can be held by the levers, that, for a large battery pack and a portable telephone having a large battery pack, the levers are rotated to be housed in the battery charger, so that the large battery pack and the portable telephone can be held by the pocket back faces, and that either of small and large battery packs can be therefore selectively held in a fixed state.

Blocks are respectively disposed in lower portions of the back faces of the front and rear pockets, the blocks having a block upper face which guides a small battery pack to a proper holding position and a block front face which abuts against a common back face of a large battery pack or a small battery pack, and spiral springs are respectively disposed inside the front- and rear-pocket levers, the spiral springs having an urging force of a degree which is sufficient for causing respective one of the front- and rear-pocket levers not to rest at an improper position. Therefore, it is possible to attain an effect that a small battery pack and a portable telephone having a small battery pack can be easily guided to respective proper holding positions so as to self stand, and held by the levers in a fixed state.

A jaw portion is disposed on a front face of the front pocket, and a height of the front face of the front pocket corresponds to a position of the front-pocket lever. Therefore, it is possible to attain an effect that the wall face of the lower portion of the back face of a large battery pack, serving as a discrimination point with respect to a small battery pack, always catches the tip end of the lever, so that the lever is housed in the battery charger, and a large battery pack and a portable telephone having a large battery pack can be held in a fixed state by the pocket back face.

The height of the jaw portion of the front face of the front pocket corresponds to the position of the front-pocket lever, a position of the block, a thickness of the portable telephone, and sizes of the large and small battery packs. Therefore, it is possible to attain an effect that a portable telephone having a battery pack can be smoothly detached without causing the common back face of the portable telephone to be caught by the block front face.

Since a tapered face is disposed in a front face of the rear pocket, an edge portion of the bottom face of a battery pack is lifted up while sliding along the tapered face. Therefore, it is possible to attain an effect that the battery pack can be smoothly detached while the back face of the battery pack is prevented from being caught by the front face of the block.

Rotation shafts of the front- and rear-pocket levers are disposed below a perpendicular from a contact point of corresponding one of the pocket levers and respective one of the battery packs to the back face of corresponding one of the pockets. Even when a load is applied to the lever in the direction toward the back face of the pocket, therefore, a component force in the rotation direction of the lever is not generated, so that the lever is prevented from being rotated. As a result, it is possible to attain an effect that a small battery pack and a portable telephone having a small battery pack can be held more stably.

What is claimed is:

1. A battery charger device comprising:
a pocket for accommodating and fixedly holding a portable telephone having a large battery pack; and
a lever which is disposed in a back face of said pocket, which fixedly holds a portable telephone having a small battery pack, in said pocket, and which, when a portable telephone having a large battery pack is to be accommodated, is rotated to be housed in said back face of said pocket.

2. A battery charger device according to claim 1, wherein block is disposed in lower portion of said back face of said pocket, said block having a block upper face which guides a small battery pack to a proper holding position and a block front face which abuts against a common back face of a large battery pack or a small battery pack, and spiral spring is disposed inside said lever, said spiral spring having an urging force of a degree which is sufficient for causing lever not to rest at an improper position.

3. A battery charger device according to claim 1, wherein a jaw portion is disposed on a front face of said pocket, and a height of said front face of said pocket corresponds to a position of said lever.

4. A battery charger device according to claim 3, wherein a height of said jaw portion of said front face of said pocket corresponds to the position of said lever, a position of said block, a thickness of said portable telephone, and sizes of said large and small battery packs.

5. A battery charger device comprising:
a front pocket for accommodating and fixedly holding a portable telephone having a large battery pack;
a rear pocket for accommodating and fixedly holding a large battery pack;
a front-pocket lever which is disposed in a back face of said front pocket, which fixedly holds a portable telephone having a small battery pack, in said front pocket, and which, when a portable telephone having a large battery pack is to be accommodated, is rotated to be housed in said back face of said front pocket; and
a rear-pocket lever which is disposed in a back face of said rear pocket, which fixedly holds a small battery pack in said rear pocket, and which, when a large battery pack is to be accommodated in said rear pocket, is rotated to be housed in said back face of said rear pocket.

6. A battery charger device according to claim 5, wherein blocks are respectively disposed in lower portions of said back faces of said front and rear pockets, said blocks having a block upper face which guides a small battery pack to a proper holding position and a block front face which abuts against a common back face of a large battery pack or a small battery pack, and spiral springs are respectively disposed inside said front- and rear-pocket levers, said spiral springs having an urging force of a degree which is sufficient for causing respective one of said front- and rear-pocket levers not to rest at an improper position.

7. A battery charger device according to claim 5, wherein a jaw portion is disposed on a front face of said front pocket, and a height of said front face of said front pocket corresponds to a position of said front-pocket lever.

8. A battery charger device according to claim 7, wherein a height of said jaw portion of said front face of said front pocket corresponds to the position of said front-pocket lever, a position of said block, a thickness of said portable telephone, and sizes of said large and small battery packs.

9. A battery charger device according to claim 5, wherein a tapered face is disposed in a front face of said rear pocket.

10. A battery charger device according to claim 5, wherein rotation shafts of said front- and rear-pocket levers are disposed below a perpendicular from a contact point of corresponding one of said pocket levers and respective one of said battery packs to said back face of corresponding one of said pockets.

* * * * *